(12) United States Patent
Boritzki et al.

(10) Patent No.: US 7,539,252 B2
(45) Date of Patent: *May 26, 2009

(54) COMMUNICATIONS SYSTEM WITH BASEBAND PILOT INJECTED CARRIER (BPIC) MODULATION/DEMODULATION AND FRAME RECOVERY AND RELATED METHODS

(75) Inventors: Daniel L. Boritzki, Palm Bay, FL (US); Michael Bernard Luntz, Merritt Island, FL (US)

(73) Assignee: Harris Corporation, Melbourne, FL (US)

( * ) Notice: Subject to any disclaimer, the term of this patent is extended or adjusted under 35 U.S.C. 154(b) by 248 days.

This patent is subject to a terminal disclaimer.

(21) Appl. No.: 11/374,592

(22) Filed: Mar. 13, 2006

(65) Prior Publication Data

US 2007/0211142 A1 Sep. 13, 2007

(51) Int. Cl.
*H04L 27/00* (2006.01)
(52) U.S. Cl. .................. 375/259; 348/21; 375/222; 455/42
(58) Field of Classification Search ................ 375/259, 375/222; 348/21; 455/42
See application file for complete search history.

(56) References Cited

U.S. PATENT DOCUMENTS

| 5,497,160 | A | 3/1996 | Koehler et al. | 342/145 |
|---|---|---|---|---|
| 5,815,115 | A | 9/1998 | Carloni et al. | 342/359 |
| 6,606,357 | B1 * | 8/2003 | Cobb et al. | 375/281 |
| 7,062,228 | B2 * | 6/2006 | Olds | 375/281 |
| 7,134,065 | B2 * | 11/2006 | McIntire et al. | 714/762 |
| 2006/0245455 | A1 * | 11/2006 | Bossler et al. | 370/522 |

* cited by examiner

*Primary Examiner*—Shuwang Liu
*Assistant Examiner*—Michael R Neff
(74) *Attorney, Agent, or Firm*—Allen, Dyer, Doppelt, Milbrath & Gilchrist, P.A.

(57) ABSTRACT

A communications system may include a transmitting device for transmitting a modulated signal therefrom based upon input data, and a receiving device for receiving the modulated signal from the transmitting device. The transmitting device may include a modulator, a baseband injected pilot carrier (BPIC) generator for generating BPIC data, and a framer for interleaving BPIC data with the input data to define data frames input to the modulator. The receiving device may include a demodulator, a frame recoverer, and a BPIC detector cooperating with the demodulator for demodulating the modulated signal from the transmitting device based upon the BPIC data and cooperating with the frame recoverer for recovering the data frames also based upon the BPIC data.

20 Claims, 9 Drawing Sheets

COMMUNICATIONS SYSTEM WITH BASEBAND PILOT INJECTED CARRIER (BPIC) MODULATION/DEMODULATION AND FRAME RECOVERY AND RELATED METHODS

FIELD OF THE INVENTION

The present invention relates to the field of communications systems, and, more particularly, to signal modulation/demodulation techniques and related methods.

BACKGROUND OF THE INVENTION

A significant concern of both providers and users of satellite communication systems is how to maximize the use of system resources. In particular, transponder bandwidth and effective isotropic radiated power (EIRP) are both important, since some portion of each is employed by every signal sent through the transponder. Because satellite resources are expensive, for the case where satellite power is the scare resource, minimizing the amount of power required for each signal allows more signals to be sent through the transponder, and thereby reduces leasing fees. An alternative application is to reduce the aperture size of the receiver antenna for the same transponder power. Certain relatively low-cost prior art systems that use small aperture antennas tend to be power-limited as they have lower G/T values, and therefore require more power from the satellite.

One particularly advantageous approach for providing enhanced power and bandwidth utilization in such communications systems is disclosed in U.S. Pat. No. 6,606,357 to Cobb et al., which is assigned to the present Assignee and is hereby incorporated herein in its entirety by reference. This patent discloses a technique for injecting a prescribed amount of carrier energy into a waveform, such as a QAM or M-ary phase shift keying (MPSK) waveform (e.g., BPSK, QPSK, 8PSK, etc.). This baseband pilot injected carrier (BPIC) component allows for detection and recovery, as opposed to nonlinear regeneration, of the carrier at the receiver.

The BPIC modulation approach is also well suited to take advantage of the enhanced performance of modern forward error correction (FEC) coding schemes, such as turbo codes, for example, to significantly reduce the signal power required for achieving a relatively low bit error rate. Namely, using a prescribed BPIC waveform in combination with advanced coding techniques allows the number of small-terminal users on a satellite transponder to be potentially doubled, thus effectively halving user leasing costs. Conversely, the BPIC waveform also may allow the use of a smaller antenna to provide more flexibility of placement and/or mobility.

Despite the significant advantages of the BPIC modulation approach, additional techniques may be desirable in certain applications to further reduce the overhead associated therewith yet while still enjoying significant power savings.

SUMMARY OF THE INVENTION

In view of the foregoing background, it is therefore an object of the present invention to provide a communications system with enhanced baseband pilot injected carrier (BPIC) modulation/demodulation features and related methods.

This and other objects, features, and advantages in accordance with the present invention are provided by a communications system which may include a transmitting device for transmitting a modulated signal therefrom based upon input data, and a receiving device for receiving the modulated signal from the transmitting device. More particularly, the transmitting device may include a modulator, a BPIC generator for generating BPIC data, and a framer for interleaving BPIC data with the input data to define data frames input to the modulator. Moreover, the receiving device may include a demodulator, a frame recoverer, and a BPIC detector cooperating with the demodulator for demodulating the modulated signal from the transmitting device based upon the BPIC data and cooperating with the frame recoverer for recovering the data frames also based upon the BPIC data.

By way of example, the framer may interleave a repeating pattern of BPIC data with the input data at an integer multiple of a frame period. Further, the demodulator may include a phase-locked loop (PLL). Also, the framer may include a forward error correction (FEC) code generator for encoding the input data. For example, the FEC code generator may be a turbo code generator.

The modulator may be an M-ary phase shift keying (MPSK) modulator, such as a BPSK, QPSK, 8PSK, etc. modulator, as well as a Quadrature Amplitude Modulation (QAM) modulator, for example. In addition, the framer may interleave the BPIC data with a uniform data portion therebetween.

A communications method aspect of the invention may include generating baseband injected pilot carrier (BPIC) data, interleaving BPIC data with input data to define data frames, and modulating the data frames to generate a modulated signal and transmitting the modulated signal. The method may further include receiving and demodulating the modulated signal based upon the BPIC data, and recovering the data frames also based upon the BPIC data.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternate embodiments.

Figure 1:
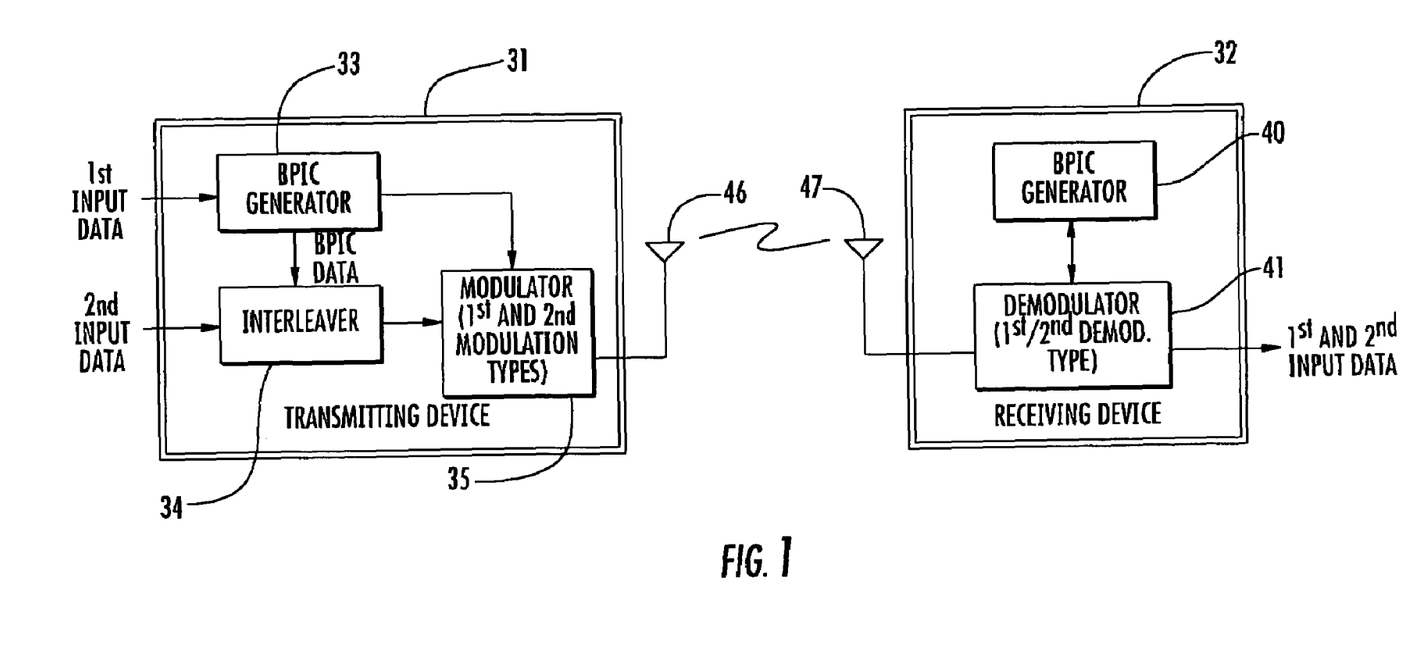
FIG. 1 is a schematic block diagram of a communications system in accordance with the present invention using selective modulation of BPIC and input data based upon first and second types of modulation.
Figure 2:
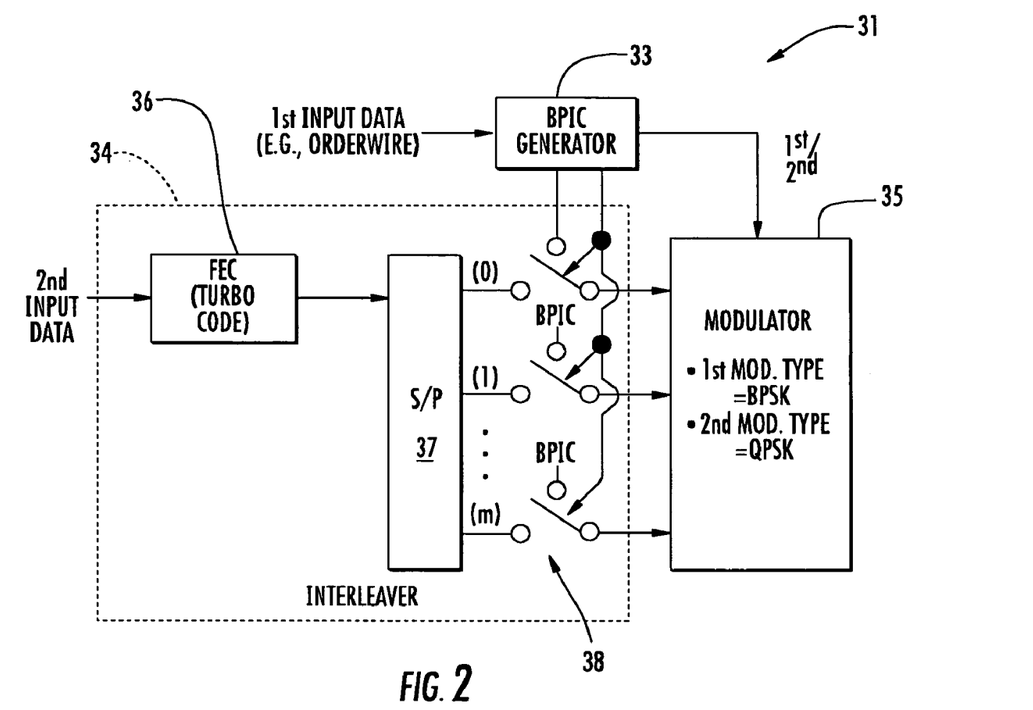
FIG. 2 is a schematic block diagram illustrating in further detail the transmitting device of the communications system of FIG. 1.
Figure 3:
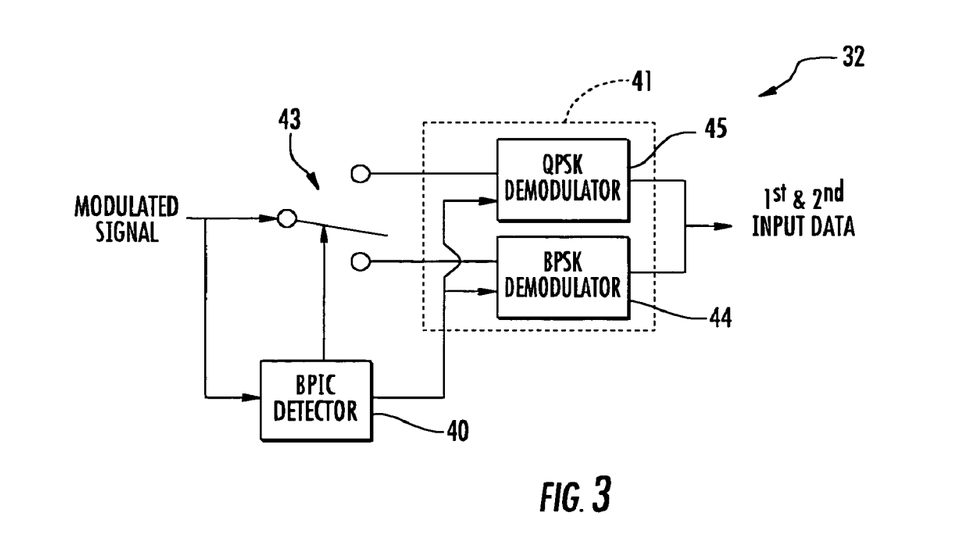
FIG. 3 is a schematic block diagram illustrating in further detail the receiving device of the communications system of FIG. 1.

Referring initially to FIGS. 1 through 3, a communications system 30 illustratively includes a transmitting device 31 for transmitting a modulated signal therefrom based upon first and second input data, and a receiving device 32 for receiving the modulated signal from the transmitting device. The second input data stream includes the information content to be transmitted to the receiver, which may include audio, video, and/or other types of data, for example.

The transmitting device illustratively includes a baseband injected pilot carrier (BPIC) generator 33 for selectively generating BPIC data corresponding to the first input data, an interleaver 34 for interleaving the BPIC data with the second input data, a modulator 35, and an antenna 46 connected thereto. In particular, the BPIC generator 33 advantageously generates BPIC data that may take one of a plurality of different data values, e.g., a binary 0 or 1. In this way, the BPIC data inserted at a given location in the data stream can correspond to the first input data.

By way of reference, the BPIC approach set forth in the above-noted U.S. Pat. No. 6,606,357 utilizes a constant offset level inserted at predetermined locations to advantageously provide a reference for demodulation. The BPIC generator 33 advantageously generates the BPIC data to correspond to the next first input data portion to be transferred, which allows actual data to be sent rather than using a constant offset reference level, and therefore provides enhanced bandwidth.

By way of example, the first input data could simply be the second input data that would otherwise be replaced (or discarded) with a BPIC offset reference in the above-noted BPIC approach. That is, the first input data stream could simply be those bits or symbols at the BPIC period or interval where the BPIC data is to be inserted. Of course, the first input data need not be a subset of the second input data. For example, the first input data could be orderwire data, as will be appreciated by those skilled in the art. Moreover, the first input data may be completely independent of the second input data in some embodiments, if desired. Various other combinations of first and second data are possible, as will also be appreciated by those skilled in the art.

Of course, changing the level or value of the BPIC data presents a challenge at the receiver or demodulation side with respect to the above-noted BPIC approach, as the offset reference is no longer constant. However, to still provide a discernable BPIC reference for demodulation, the modulator 35 advantageously modulates the interleaved BPIC data based upon a first modulation type, and modulates the second input data based upon a second modulation type that is different than the first modulation type to provide the modulated signal.

Referring more particularly to the example illustrated in FIG. 2, the modulator 35 uses BPSK as the first modulation type for modulating the BPIC data, and the second modulation type used for modulating the second input data is QPSK. Accordingly, it will be appreciated by those skilled in the art that in the present example each BPIC symbol may correspond to one of two data values, namely 0 or 1, while the second input data symbols may correspond to one of four different values (i.e., 00, 01, 10, 11). Yet, the symbol generated by BPSK modulation of the BPIC data will be distinguishable from the second input data symbols generated using QPSK modulation, and can therefore be readily identified for use in demodulation, as will be appreciated by those skilled in the art.

It should be noted that other modulation types may be used in addition to those described above. Generally speaking, one approach for selecting the types of modulation to use is to use a lower-order modulation type for modulating the BPIC data than the second input data. In the above-noted example, QPSK is of a higher order than BPSK (i.e., quadrupling vs. squaring), but in some embodiments QPSK could be the first modulation type and 8PSK used as the second modulation type, for example. Of course, other types of modulation may be used as well, such as QAM. The objective is that the first type of modulation produces a discernable symbol (or symbols) during demodulation with respect to the second input data modulated using the second modulation type.

The interleaver 34 illustratively includes a forward error correction (FEC) coder 36 which receives the second input data stream, which in the illustrated example is a serial data stream. As will be discussed in greater detail below, the BPIC modulation technique advantageously allows the demodulator to take advantage of the relatively high coding gains achievable with turbo code, although various FEC formats may be used. A serial-to-parallel (S/P) converter 37 converts the encoded second input data stream to a plurality of parallel outputs (0)-(m). Of course, it should be noted that in some embodiments the input may be parallel and the S/P converter 37 need not be included.

The BPIC generator 33 causes the interleaver 34 to interleave the BPIC data at predetermined BPIC intervals in the encoded second input data stream, as illustrated by switches 38. More particular, during the BPIC interval (e.g., every $n^{th}$ symbol), the inputs of the modulator 35 are switched to an output(s) of the BPIC generator so that the given BPIC data is modulated rather than the second input data that would otherwise have been present. By way of example, for the case of BPSK modulation, the desired data value (0 or 1) may be provided to the first input of the modulator 35, while the remaining inputs of the modulator are provided with a 0 value or a known pattern. Moreover, the modulator 35 is also provided with a control signal from the BPIC generator to cause it to switch to the first modulation type during the BPIC interval, and then back to the second modulation type for modulating the second input data.

It should be noted that while the modulator 35 is illustrated as a single component in FIG. 2 for clarity of illustration, the modulation operations may be performed by separate modulators. Of course, it will be appreciated by those skilled in the art that the various functions of the transmitting device 31 and receiving device 32 components may be implemented in numerous ways, such as with distinct circuits, application specific integrated circuits (ASICs), programmable logic devices (PLDs), and/or using one or more processing devices such as microprocessors, digital signal processors (DSPs), etc. and appropriate software modules, etc.

The receiving device 32 illustratively includes a BPIC detector 40 and a demodulator 41 cooperating with the BPIC detector for demodulating the modulated signal from the transmitting device 31 based upon the BPIC data (which, upon modulation, provide BPIC symbols) to generate the first and second input data. An antenna 47 is illustratively connected to the demodulator 41. Referring more particularly to FIG. 3, the BPIC detector 40 detects the location of the BPIC symbols within the modulated signal to thereby selectively switch (as illustratively represented by a switch 43) the modulated signal to a first (e.g., BPSK) demodulation stage 44 during the BPIC interval, and otherwise to a second (e.g., QPSK) modulation stage 45. Further details on BPIC modulation and demodulation techniques may be found in the above-noted U.S. Pat. No. 6,606,357.

Figure 4:
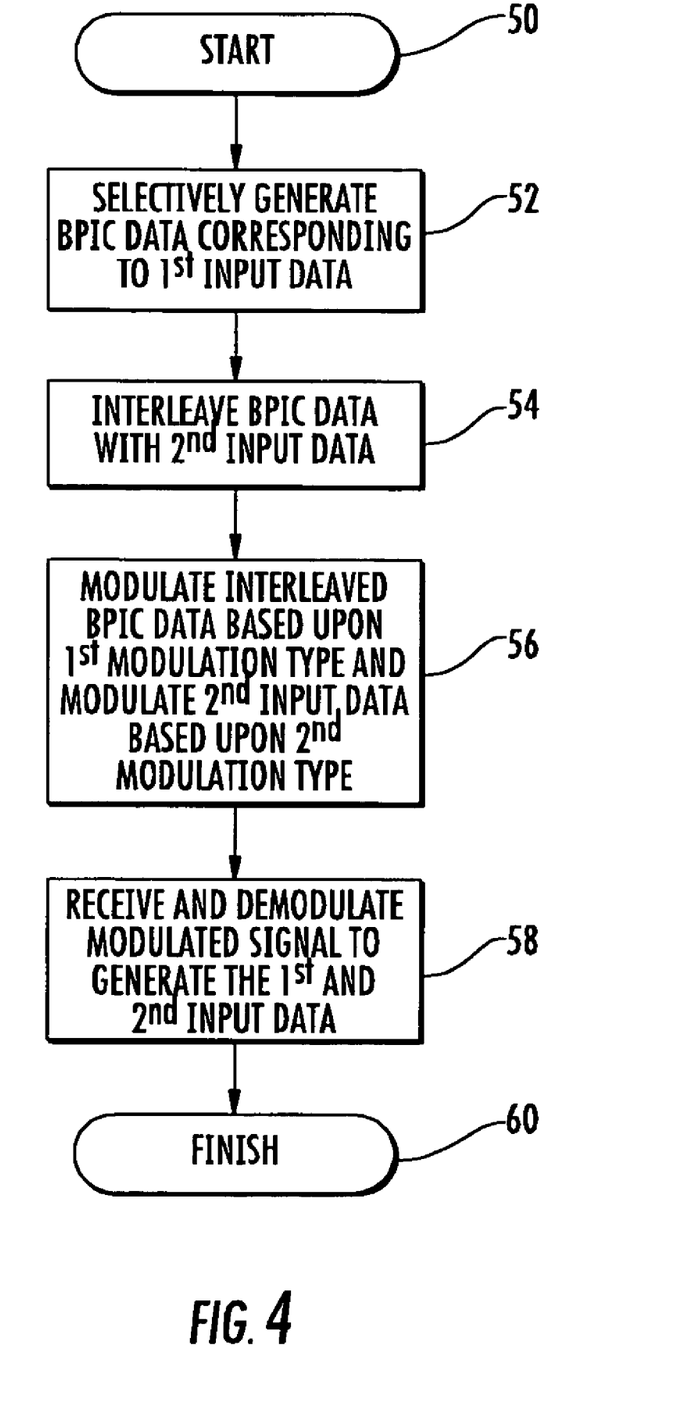
FIG. 4 is flow diagram illustrating a BPIC communications method in accordance with the present invention.

Turning now additionally to FIG. 4, a communications method aspect of the invention illustratively begins at Block 50 with selectively generating BPIC data corresponding to first input data, at Block 52, and interleaving the BPIC data with second input data, at Block 54. The method may further include modulating the interleaved BPIC data based upon a first modulation type and modulating the second input data based upon a second modulation type to provide a modulated signal and transmitting the modulated signal, at Block 56, as discussed further above. Furthermore, the method may also include receiving and demodulating the modulated signal based upon the BPIC data to generate the first and second input data, at Block 58, thus concluding the illustrated method (Block 60).

The use of BPSK modulation for the BPIC data may be particularly advantageous in some embodiments because in the BPIC detector 40 the BPIC tracking would only experience a squaring loss instead of the quadrupling loss associated with QPSK, for example, yet still maintain desired signal attributes. Moreover, actual encoded user data, orderwire data, etc., can be sent as the BPIC symbols, since these symbols do not have to be a known or constant symbol pattern at the receiving device 32 for BPIC detection. This advantageously lowers overhead and increases the throughput of the communications link.

Moreover, this may also reduce spectral lines in the recovered BPIC symbol(s), which may be particularly important for satellite communication applications where the spectral mask is tightly defined, as will be appreciated by those skilled in the art. Additionally, the above-described approach may also allow the demodulator 41 to track and provide desired performance at relatively low Es/No relative to using a higher order modulation for both the second input data and the BPIC data.

As noted above, this approach also allows for a better utilization of turbo codes, and may also provide a significant improvement in Doppler tracking. More particularly, there are several types of iterative turbo coding/decoding methods available in both hardware (HW) and software (SW). In general, with turbo codes it is now possible to get coding gains 2 to 3 dB better relative to conventional concatenated convolutional/Reed Solomon decoding methods. There are multiple ways to take advantage of this additional gain, but the improvement generally gives an advantage in one of three categories, namely bandwidth, throughput, or power. Most modem manufacturers that have implemented turbo codes have only addressed the first two because, in general, the third (power) requires a receiver capable of operating at very low Es/No.

With respect to bandwidth, since turbo codes in general have higher coding gain per bit, a code with less overhead can produce equivalent performance. Higher coding gain can be used to decrease bandwidth while maintaining constant throughput and power. By maintaining a constant Carrier-to-Noise ratio (C/N) combined with a lower overhead, the link can be established utilizing less bandwidth. Since demodulator tracking performance is based on C/N, a demodulator that worked with the concatenated code will also work with the turbo code, if the goal is to save bandwidth. The down side is that no improvement in antenna size, Doppler tracking or acquisition is realized. In essence, the result is the same acquisition and tracking performance that was already available.

As for throughput, higher coding gain can similarly be used to increase throughput while maintaining constant bandwidth and power. Since turbo codes require less overhead for the same coding gain, the user's information rate can be increased with the lower overhead applied to provide the same bandwidth, but with increased user data rate. Again, by maintaining constant C/N, a demodulator that tracked the carrier using a concatenated coding scheme can also be used.

Regarding power, in certain applications there will be adequate bandwidth, and a need for moderate to high data rates, but the system is limited to a small aperture, such as on a ship, portable terminal, etc. The additional coding performance of turbo codes can be applied using a lower C/No at the cost of bandwidth. In this way the system can benefit from a smaller aperture or lower the satellite transponder power by 2 to 3 dB per link. The BPIC approach allows the terminal to take advantage of this reduction in power. In addition, it significantly improves the acquisition and tracking performance as compared to a conventional regenerative demodulator.

Figure 5:
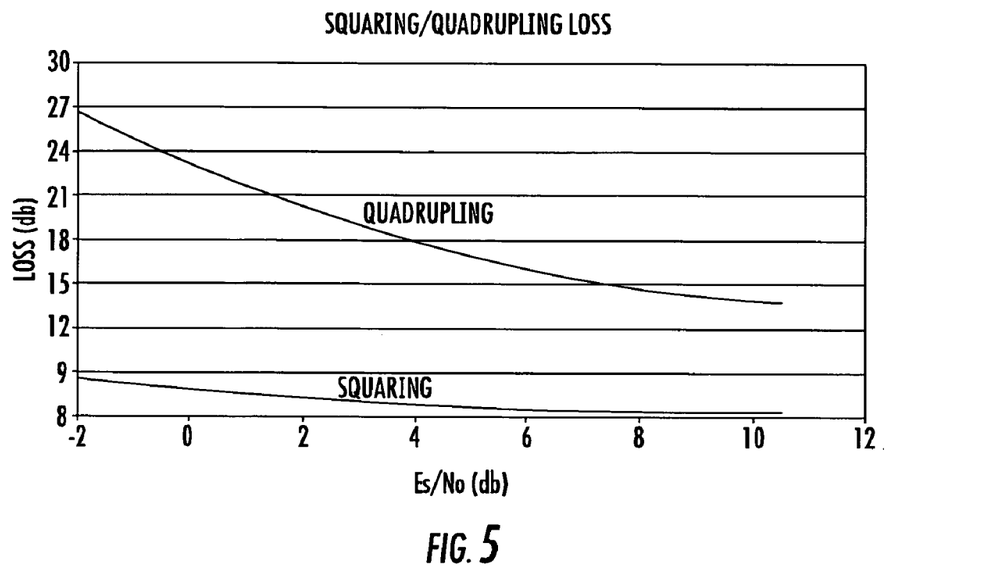
FIG. 5 is a graph of signal loss vs. signal-to-noise ratio (Es/No) illustrating the effects of noise caused by different order signal regeneration processes.

Conventional demodulators use regenerative loops to recover the carrier and use this replicated carrier to achieve near theoretical performance for PSK. One problem with this type of receiver is that the regeneration process increases the noise exponentially as the S/N decreases. As noted above, for BPSK there is squaring loss, for QPSK, there is quadrupling loss, as may be seen in FIG. 5.

Therefore, the loop bandwidth of the tracking loop has to be significantly reduced to compensate for this loss in signal-to-noise. At 3 or 4 dB Es/No this loss is not too severe, and conventional receivers can track with reasonable performance. But at 0 dB Es/No where the turbo coding can significantly help a disadvantaged terminal, the quadrupling loss is quite large.

Before further explaining this point, it is helpful to provide certain definitions. Eb/No is defined as the energy per information bit. Ec/No is the energy per channel bit after coding and other overhead. Es/No is the energy per transmitted symbol after all coding and other overhead, where:

$Ec/No=(Eb/No)*(\text{code rate})$, and $Es/No=(Ec/No)/\log_2(M)$.

Accordingly, if the information rate is rate 1/2 coded, then the channel rate is twice the information bit rate. Similarly, the symbol rate is the channel rate divided by $\log_2(M)$, where M is the order of the modulation (M=4 for QPSK). Based on the foregoing definitions, a rate 1/3 coded QPSK carrier, whose information bit rate is 1 bps, has a channel rate of 3 bps and a symbol rate of 1.5 bps. ($10\log_{10}[1.5]=1.8$ dB). For such a case, the Es/No=(Eb/No−1.8 dB).

Figure 6:
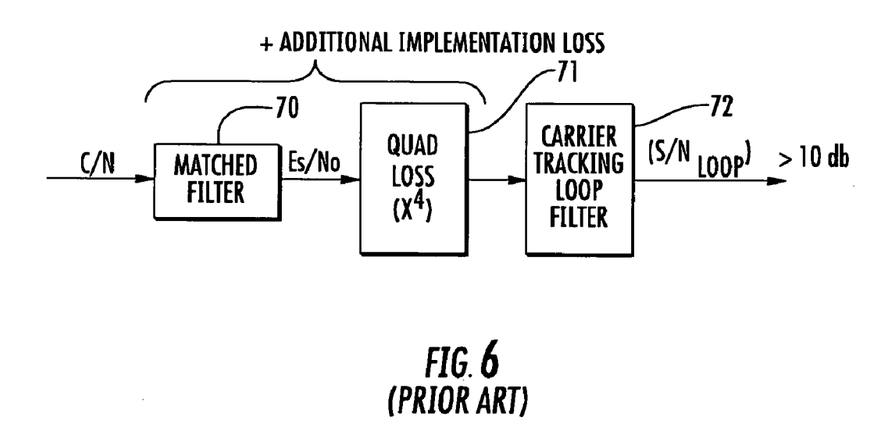
FIG. 6 is a schematic block diagram of a prior art demodulator tracking loop.

Turning now to FIG. 6, a general example of a tracking loop is now described which assumes a QPSK signal with a 512 KBPS information bit rate using a rate 1/3 turbo code to a small aperture terminal providing performance within 1 dB of theory. The input signal C/N gets filtered by a symbol rate matched filter 70 to provide Es/No minus the implementation loss (which is assumed to be <1 dB). The quadrupling loss of a QPSK demodulator 71 further degrades the S/N ratio. A carrier tracking loop filter 72 will thus have to improve the S/N to provide a positive S/N ratio in the tracking loop to maintain carrier lock within a reasonable margin against the specified performance. Below 6 dB the loop will not maintain a lock. Other values besides 10 dB could be used based upon the given jitter and phase noise performance requirements, etc., in a given implementation. Increased S/N in the loop would require an even narrower loop bandwidth.

It follows from the foregoing that:

$$Es/No - IL - Quad\ Loss - Margin + 10\log\left(\frac{SR}{2B_L}\right) > 10\,\text{dB},$$

where Es/No is the energy per transmitted symbol after all coding and other overhead, IL=implementation loss (assumed to 1 dB), Margin=1 dB against specification, Quad Loss=the quadrupling loss due to the regenerative receiver, SR=the received coded symbol rate (basis for Es/No), and BL=the single sided tracking loop bandwidth in Hz. Conventional commercial demodulators typically cannot maintain a lock below about 3 or 4 dB Eb/No. It is generally a trade off between acquisition, tracking and dynamic performance. Using the above equation, for a 512 KBPS link assuming an Eb/No of 4 dB with rate 1/3 coding, this results in a single sided loop bandwidth ($B_L$) of about 197 Hz. However, for a 512 KBPS link assuming an Eb/No of 0 dB with rate 1/3 coding the result is a single sided loop bandwidth ($B_L$) of about 16 Hz. This provides a factor of over 10 reduction in loop bandwidth. It should be noted that this tracking loop has to track four times the imposed Doppler because of the quadrupling of the carrier and the ability to track the Doppler goes down with the square of the reduction in loop bandwidth.

Figure 7:
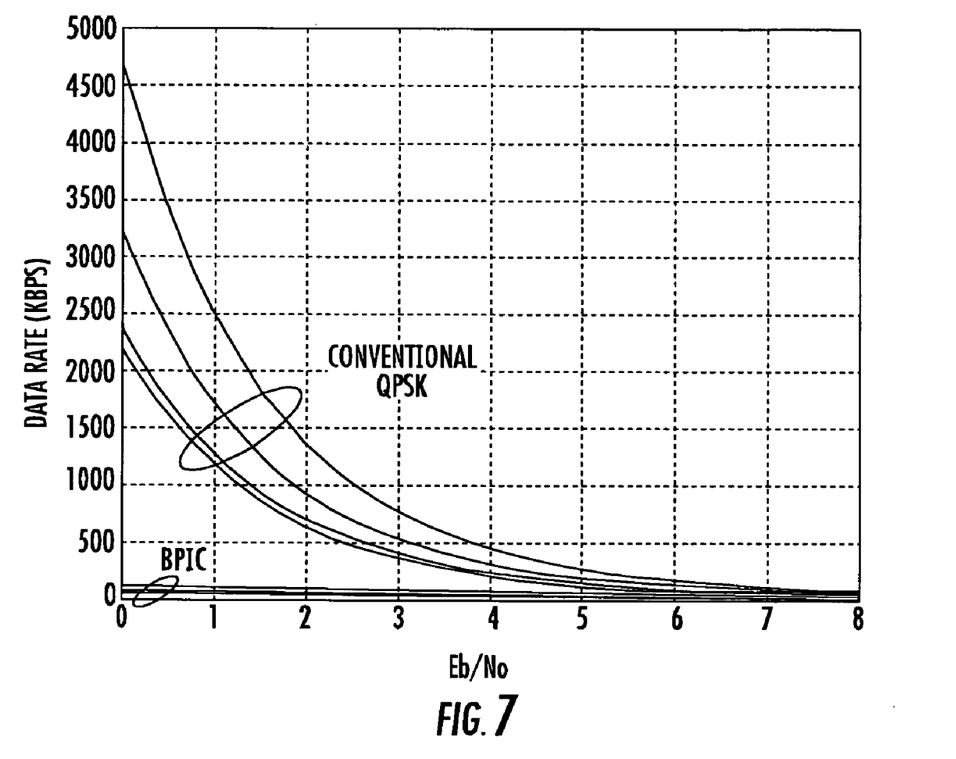
FIG. 7 is a graph comparing data rate vs. Eb/No for prior art QPSK modulation and BPIC-based QPSK modulation under various Doppler rate conditions.
Figure 8:
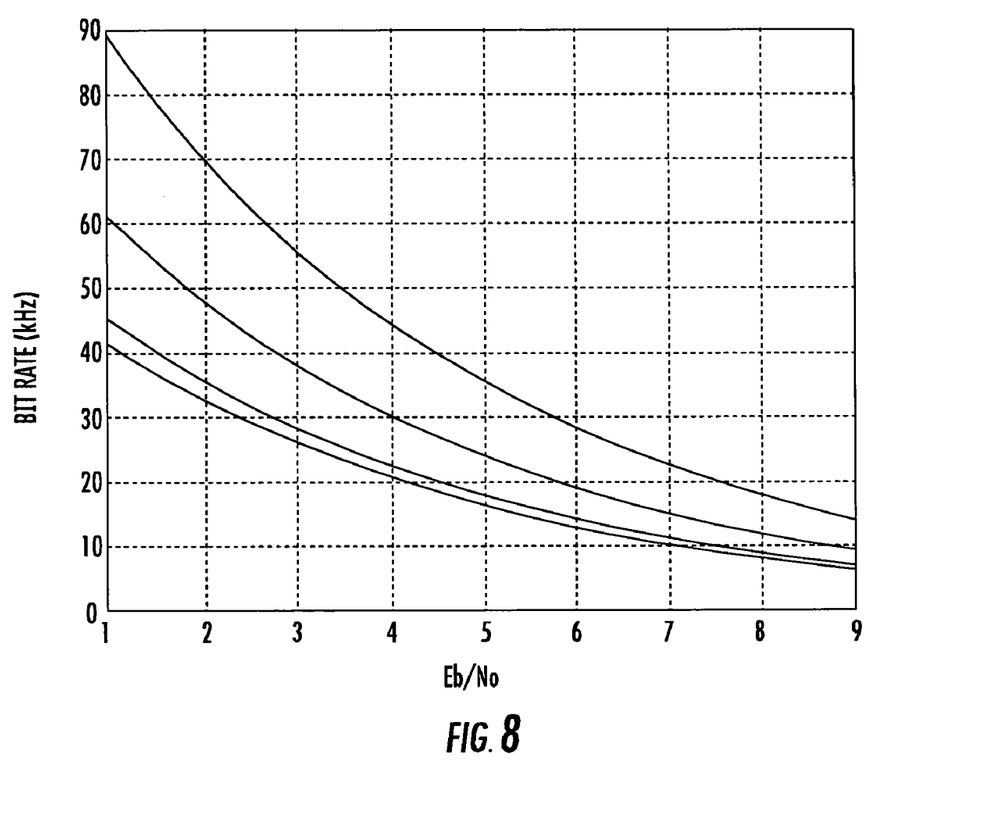
FIG. 8 is a graph illustrating in greater detail a portion of the BPIC-based QPSK modulation curves of FIG. 7.

Referring additionally to FIGS. 7 and 8, for a 20:1 BPIC waveform (i.e., the BPIC interval is every twentieth symbol), the quad loss is replaced by a nearly constant 13 dB loss (10log[20:1]), plus about another 0.3 dB of implementation loss due to the additional overhead. Therefore, the loop bandwidth for 0 dB Eb/No for a rate 1/3 coded QPSK with BPIC is about 500 Hz, and it only has to track one times the Doppler, not four times like the conventional loop. These bandwidths will scale with data rate. While improvement diminishes somewhat as the Eb/No increases, for most cases it does not get any worse than the regenerative loop, and at low Eb/No it may provide orders of magnitude of improvement. By way of example, tracking down to −6 dB Es/No may be provided for BPIC rates from 3:1 up to 63:1. This advantageously allows for tracking during fades without loss of lock at very low Eb/No.

One particular application in which the BPIC approach has a significant advantage is for Doppler or ship/vessel motion tracking. The quadrupling loop has to track four times the Doppler since it is actually tracking the forth harmonic of the carrier, whereas BPIC only has to track one times the Doppler when implemented using a conventional phase-locked loop (PLL). The Doppler or ship motion tracking improves proportionally to the square of the loop bandwidth. As can be seen from FIGS. 7 and 8, the BPIC loop in the illustrated example can provide greater than a 40:1 improvement in Doppler tracking with respect to a regenerative receiver when tracking at low signal to noise ratios.

Using the Doppler rate of changes set forth in Table 1 below, the Doppler tracking results will now be evaluated for both the conventional regenerative and BPIC methods of carrier tracking assuming equivalent coding and modulation.

TABLE 1

| Parameter | C-Band | X-Band | Ku-Band | Ka-Band |
|---|---|---|---|---|
| Doppler Rate of Change (Hz/sec) | ±226 | ±270 | ±490 | ±1046 |

Figure 9:
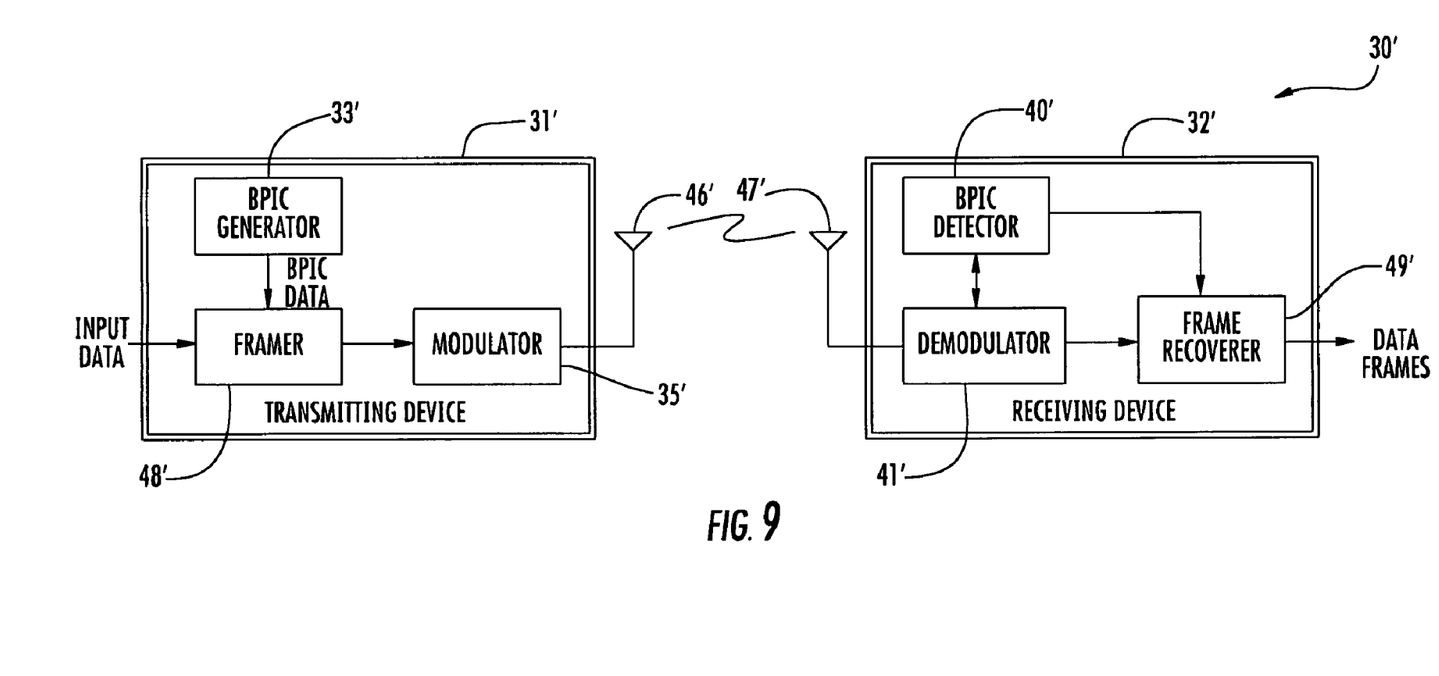
FIG. 9 is a schematic block diagram of a communications system in accordance with the present invention using BPIC data for data frame reconstruction.

As can be seen in FIGS. 8 and 9, at the C/No that provides 0 dB Eb/No with a rate 1/3 turbo code, the lowest data rate that will track at threshold and still meet the Ka band Doppler is about 4700 KBPS, whereas BPIC may provide the same tracking performance at about 90 KBPS.

It will therefore be appreciated that the BPIC waveform provides a significant and quantifiable performance advantage with respect to a conventional demodulator, especially at low signal-to-noise ratios. With relatively minimal additional implementation loss (i.e., less than about 0.3 dB) it can provide orders of magnitude improvement in tracking performance, and may therefore be able to handle ship motion Doppler without external compensation at low S/N ratios and moderate data rates in some implementations. However, if the data rates were increased using a conventional modem such that the loops were finally wide enough to track the ships Doppler, it still has to track four times as much due to its implementation and will not maintain a lock in severe fades. The conventional receiver requires 2 to 3 dB more C/N to close the link with the same BER, and even if it maintains the lock, it may have orders of magnitude worse tracking performance compared to BPIC.

Another potential advantage of BPIC tracking is that it may be used for data frame recovery. More particularly, many communications system use framed data patterns to provide timing or routing information, as will be appreciated by those skilled in the art. Such systems may include routers, multiplexers, and FEC coders. However, when data frames are used, some additional framing overhead is required in the form of a preamble or unique word between frames, groups of frames (i.e., super frames), or code blocks to differentiate one from the next, which reduces throughput.

Turning now to FIGS. 9-12, a communications system 30' illustratively includes a transmitting device 31' for transmitting a modulated signal therefrom based upon input data, and a receiving device 32' for receiving the modulated signal from the transmitting device. More particularly, the transmitting device 31' illustratively includes a modulator 35', a BPIC generator 33' for generating BPIC data, and a framer 48' for interleaving the BPIC data with the input data to define data frames input to the modulator. It should be noted that in the illustrated embodiment the above-described technique of using first and second types of modulation may be used, but it need not be in all embodiments.

Figure 12:
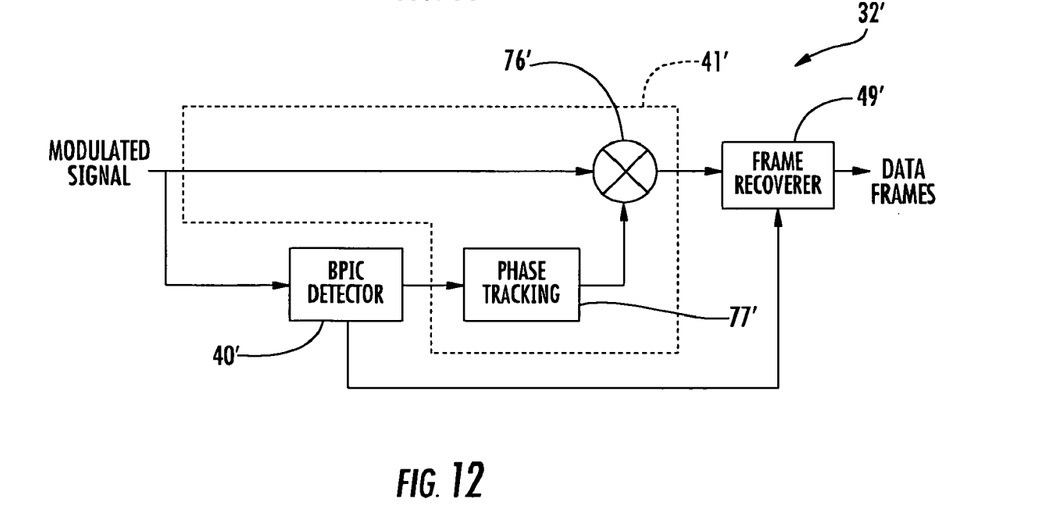
FIG. 12 is a schematic block diagram illustrating in further detail the receiving device of the communications system of FIG. 9.

The receiving device 32' illustratively includes a demodulator 41', a frame recoverer 49', and a BPIC detector 40' cooperating with the demodulator for demodulating the modulated signal from the transmitting device 31' based upon the BPIC data and cooperating with the frame recoverer for recovering the data frames also based upon the BPIC data. In particular, the BPIC data is interleaved with the input data so that the BPIC symbol pattern occurs in a periodic manner that is consistent with the framing period and may therefore be used instead of preambles or unique words for frame differentiation.

By way of example, the framer 48' may interleave a repeating pattern of BPIC data with the input data at an integer multiple of a frame period. For the example illustrated in FIG. 11, each frame includes a number a of data portions (here eight), which are represented by unfilled blocks. The frames are separated by a space for clarity of illustration, although there would typically not be a space or delay between beginning and ending data portions of adjacent data frames. Moreover, BPIC data (which may correspond to one or more symbols) is injected in the input data stream at the position of every $n^{th}$ data portion (here n=10), and the BPIC data is represented by a solid block. That is, there is a uniform number b of input data portions (here nine) between each BPIC data location.

Figure 11:
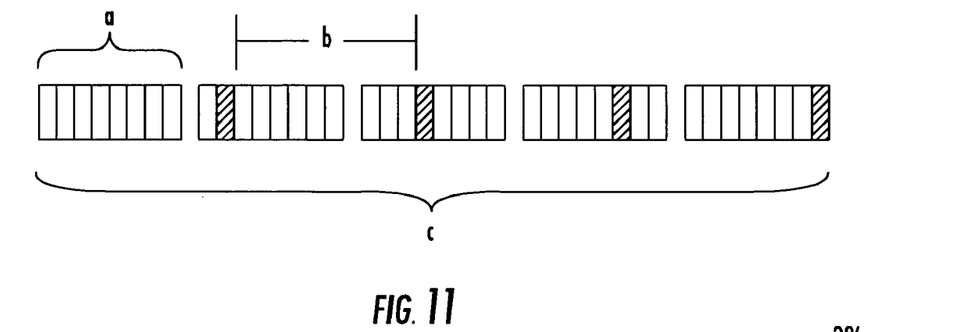
FIG. 11 is a data sequence diagram illustrating a sequence of input data frames with BPIC data interleaved therein.

As a result, the pattern of BPIC data symbols will repeat at an integer number of frames c (here five) defining a super frame. Accordingly, when the repetitive pattern of injected BPIC data is made to repeat at an integer multiple of a frame period, BPIC symbol tracking may advantageously be used to provide frame synchronization and phase ambiguity resolution, as will be appreciated by those skilled in the art. Of course, the BPIC pattern may be made to repeat at frame, super-frame, or code block boundaries.

Figure 10:
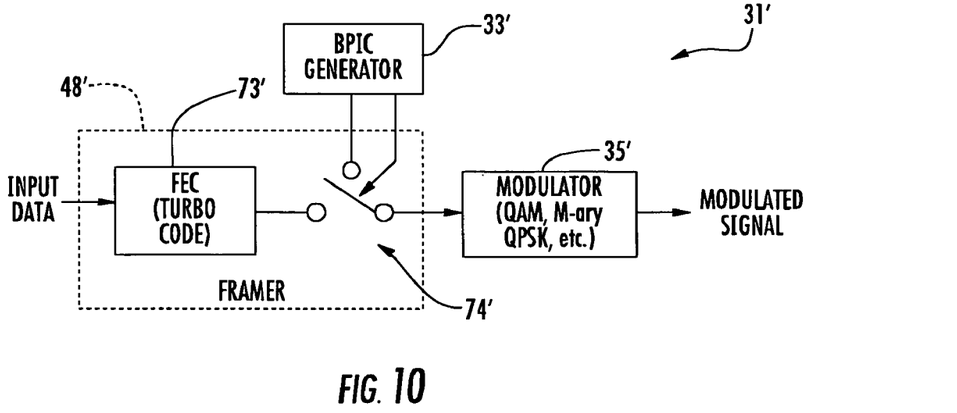
FIG. 10 is a schematic block diagram illustrating in further detail the transmitting device of the communications system of FIG. 9.

The framer 48' illustratively includes an FEC generator (e.g., a turbo coder) 73', and the BPIC generator causes the framer to interleave the BPIC data in the input data stream, as illustrated by a switch 74'. The modulator 35' may be an MPSK modulator, such as a BPSK, QPSK, 8PSK, etc. modulator, as well as a QAM modulator, for example.

The demodulator 41', which in the example illustrated in FIG. 12 is a QPSK demodulator, includes a squaring stage 76'. The squaring stage 76' receives the modulated signal, as does the BPIC detector 40'. The demodulator 41' further includes a phase tracker 77' downstream from the BPIC detector 40', and the output of the phase tracker is also connected to the squaring stage 76'. The output of the squaring stage 76' is input to the frame recoverer 49' for recovering the original frames of input data, and the frame recoverer receives a control input from the BPIC detector 40' as shown. It should be noted that in some embodiments a band-pass filter may be used instead of a PLL, as will be appreciated by those skilled in the art.

Figure 13:
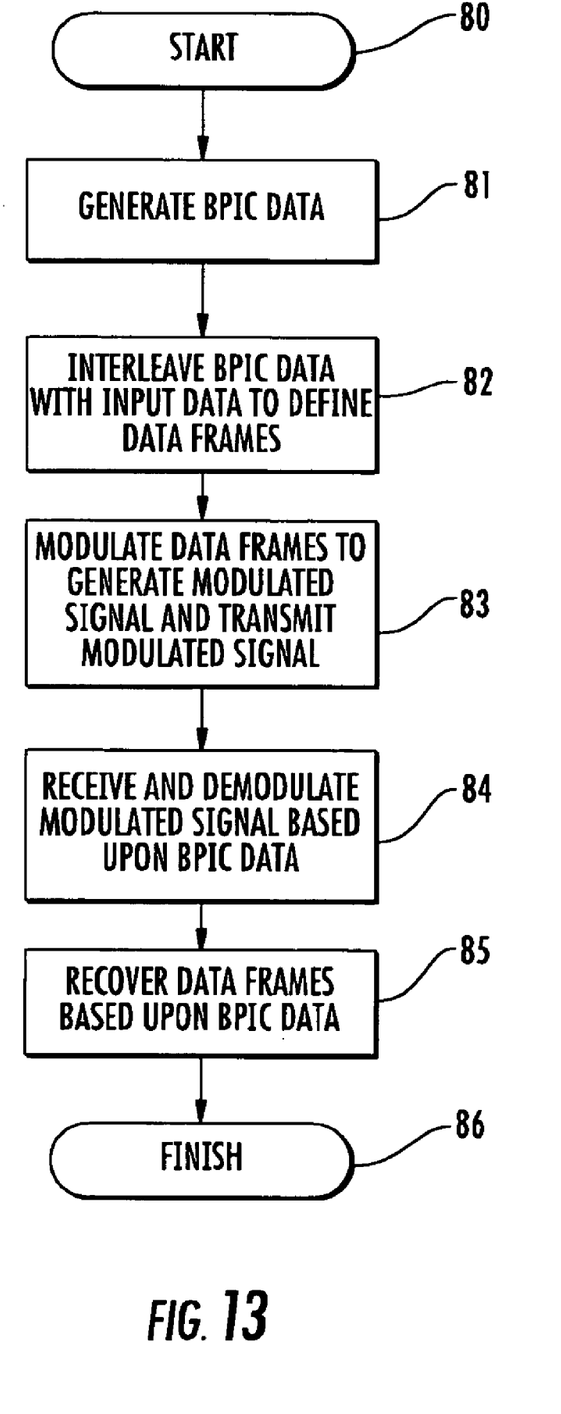
FIG. 13 is flow diagram illustrating another BPIC communications method in accordance with the present invention.

A related communications method aspect is now described with reference to FIG. 13. Beginning at Block 80, the method illustratively includes generating BPIC data (Block 81), interleaving BPIC data with input data to define data frames (Block 82), and modulating the data frames to generate a modulated signal and transmitting the modulated signal (Block 83), as discussed further above. The method may further include receiving and demodulating the modulated signal based upon the BPIC data, at Block 84, and recovering the data frames also based upon the BPIC data, at Block 85, thus concluding the illustrated method.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A communications system comprising:
a transmitting device for transmitting a modulated signal therefrom based upon input data comprising a bit stream, the transmitting device comprising:
a baseband injected pilot carrier (BPIC) generator for generating BPIC data including user information,
a framer for interleaving the BPIC data within the input data bit stream to define data frames, and
a modulator for modulating the interleaved BPIC data based upon a first modulation type and modulating the input data based upon a second modulation type different than the first modulation type to provide a modulated signal; and
a receiving device for receiving the modulated signal from said transmitting device, the receiving device comprising:
a demodulator,
a frame recoverer, and
a BPIC detector cooperating with said demodulator for demodulating the modulated signal from said transmitting device based upon the BPIC data and cooperating with said frame recoverer for recovering the data frames and user information also based upon the BPIC data.

2. The communications system of claim 1 wherein said framer interleaves a repeating pattern of BPIC data with the input data at an integer multiple of a frame period.

3. The communications system of claim 1 wherein said demodulator comprises a phase-locked loop(PLL).

4. The communications system of claim 1 further comprising a forward error correction (FEC) code generator upstream from said modulator for encoding the input data.

5. The communications system of claim 4 wherein said FEC code generator comprises a turbo code generator.

6. The communications system of claim 1 wherein at least one of the first and second modulation types comprises M-ary phase shift keying (MPSK) modulation.

7. The communications system of claim 1 wherein at least one of the first and second modulation types comprises Quadrature Amplitude Modulation (QAM).

8. The communications system of claim 1 wherein said framer interleaves the BPIC data with a uniform data portion therebetween.

9. A transmitting device for transmitting a modulated signal therefrom based upon input data comprising a bit stream, the transmitting device comprising:
a baseband injected pilot carrier (BPIC) generator for generating BPIC data;
a framer for interleaving BPIC data including user information within the input data bit stream to define data frames input to said modulator; and
a modulator for modulating the interleaving the BPIC data based upon a first modulation type and modulating the input data based upon a second modulation type different than the first modulation type to provide a modulated signal.

10. The transmitting device of claim 9 wherein said framer interleaves a repeating pattern of BPIC data with the input data at an integer multiple of a frame period.

11. The transmitting device of claim 9 further comprising a forward error correction (FEC) code generator upstream from said modulator for encoding the input data.

12. A receiving device comprising:
a demodulator for receiving a modulated signal generated based upon baseband injected pilot carrier (BPIC) data interleaved within input data comprising a bit stream to define data frames, the BPIC data including user information and being modulated based upon a first modulation type, and the input data being modulated based upon a second modulation type different than the first modulation type;

a frame recoverer; and a BPIC detector cooperating with said demodulator for demodulating the modulated signal based upon the BPIC data and cooperating with said frame recoverer for recovering the data frames and user information also based upon the BPIC data.

13. The receiving device of claim 12 wherein the BPIC data is interleaved with the input data in a repeating pattern at an integer multiple of a frame period.

14. The receiving device of claim 12 wherein said demodulator comprises a phase-locked loop (PLL).

15. A communications method comprising:

generating baseband injected pilot carrier (BPIC) data including user information at a transmitting device;

interleaving the BPIC data within input data comprising a bit stream to define data frames at the transmitting device;

modulating the interleaved BPIC data based upon a first modulation type and modulating the input data based upon a second modulation type different than the first modulation type to provide a modulated signal at the transmitting device, and transmitting the modulated signal from the transmitting device;

receiving the modulated signal at a receiving device and demodulating the modulated signal based upon the BPIC data; and recovering the data frames and user information also based upon the BPIC data at the receiving device.

16. The method of claim 15 wherein interleaving comprises interleaving a repeating pattern of BPIC data with the input data at an integer multiple of a frame period.

17. The method of claim 15 further comprising encoding the input data prior to modulation using a forward error correction (FEC) code.

18. The method of claim 17 wherein the FEC comprises a turbo code.

19. The method of claim 15 wherein at least one of the first and second modulation types comprises M-ary phase shift keying (MPSK) modulation.

20. The method of claim 15 wherein interleaving comprises interleaving the BPIC data with a uniform data portion therebetween.

* * * * *